(12) United States Patent
Patel et al.

(10) Patent No.: US 10,778,263 B2
(45) Date of Patent: Sep. 15, 2020

(54) POLY PHASED, TIME-INTERLEAVED RF-DAC FOR MULTI-FUNCTION FREQUENCY-AGILE, TUNABLE TRANSMITTER

(71) Applicant: Government of the United States as represented by the Secretary of the Air Force, Wright-Patterson AFB, OH (US)

(72) Inventors: Vipul J. Patel, Dayton, OH (US); John M Emmert, Dayton, OH (US); Waleed Khalil, Dublin, OH (US)

(73) Assignee: United States of America as represented by the Secretary of the Air Force, WPAFB, OH (US)

( * ) Notice: Subject to any disclaimer, the term of this patent is extended or adjusted under 35 U.S.C. 154(b) by 0 days.

(21) Appl. No.: 16/792,934

(22) Filed: Feb. 18, 2020

(65) Prior Publication Data

US 2020/0266842 A1 Aug. 20, 2020

Related U.S. Application Data

(60) Provisional application No. 62/806,550, filed on Feb. 15, 2019.

(51) Int. Cl.
*H04B 1/04* (2006.01)
*H04L 27/36* (2006.01)
*H04B 1/00* (2006.01)

(52) U.S. Cl.
CPC .............. *H04B 1/04* (2013.01); *H04B 1/0028* (2013.01); *H04L 27/36* (2013.01)

(58) Field of Classification Search
CPC ..... H04L 27/0002; H04B 1/04; H04B 1/0475; H04B 1/0483
See application file for complete search history.

(56) References Cited

U.S. PATENT DOCUMENTS 8,502,720 B1 * 8/2013 Wyville .............. H03M 1/0629
341/143

OTHER PUBLICATIONS

J. Mitola, "The Software Radio Architecture," Communications Magazine, IEEE, vol. 33, No. 5, pp. 26-38, May 1995.
Balasubramanian, S., et al., "Systematic Analysis of Interleaved Digital-to-Analog Converters," Circuits and Systems II: Express Briefs, IEEE Transactions on, vol. 58, No. 12, pp. 882-886, Dec. 2011.
Mensink, E., et al., "Distortion cancellation by polyphase multipath circuits," Circuits and Systems I: Regular Papers, IEEE Transactions on, vol. 52, No. 9, pp. 1785-1794, Sep. 2005.
S. Kousai, et al. "An octave-range, watt-level, fully integrated CMOS switching power mixer array for linearization and back-off-efficiency improvement," IEEE J. Solid-State Circuits, vol. 44, No. 12, pp. 3376-3392, Dec. 2009.

(Continued)

*Primary Examiner* — Kevin Kim
(74) *Attorney, Agent, or Firm* — AFMCLO/JAZ; Jeffrey V. Bamber

(57) ABSTRACT

In accordance with various embodiments of the disclosed subject matter, a system, apparatus and method is configured to provide a poly-phased, time-interleaved radio frequency (RF) digital-to-analog converter (DAC) suitable for use in radar, radio, mobile and other RF systems.

20 Claims, 10 Drawing Sheets

(56) References Cited

OTHER PUBLICATIONS

M. Terrovitis, et al., "Intermodulation distortion in current-commutating CMOS mixers,", IEEE J. Solid-State Circuits, vol. 35, No. 10, pp. 1461-1473, Oct. 2000.
S. Luschas et al., "Radio frequency digital-to-analog converter," IEEE Journal of Solid-State Circuits, vol. 39, No. 9, pp. 1462-1467, Sep. 2004.

* cited by examiner

POLY PHASED, TIME-INTERLEAVED RF-DAC FOR MULTI-FUNCTION FREQUENCY-AGILE, TUNABLE TRANSMITTER

CROSS-REFERENCE TO RELATED APPLICATION

This application claims the benefit of and priority to prior filed Provisional Application Ser. No. 62/806,550, filed Feb. 15, 2019, entitled IMPROVED DIGITAL TO ANALOG CONVERTERS, which is incorporated herein by reference in its entirety.

GOVERNMENT INTEREST

The invention described herein may be manufactured and used by or for the Government of the United States for all governmental purposes without the payment of any royalty.

FIELD OF THE DISCLOSURE

The present disclosure relates to radio frequency (RF) transmitters and, more specifically, to the processing of digital baseband signals prior to RF transmission.

BACKGROUND

Conventional radio frequency (RF) transmitter designs generally comprise a digital-to-analog converter, filter, mixer, and power amplifier operative to generate an output RF transmission signal in response to a digital base-band signal. Unfortunately, existing RF transmitter designs are frequency and application-specific, suffer from spectral impurities and require the use of relatively large components, such as discrete passive components typically used in low-pass filters and the like.

SUMMARY

Various deficiencies in the prior art are addressed below by the disclosed systems, methods, architectures, mechanisms, apparatus and the like configured to provide a poly-phased, time-interleaved radio frequency (RF) digital-to-analog converter (DAC) suitable for use in radar, radio, mobile and other RF systems benefiting from a reduced level of spectral artifacts such an non-linearity, imaging, sidebands, and the like while avoiding the use of large discrete passive filtering components (i.e., the embodiments may be implemented using standard integrated circuit chip fabrication techniques).

In particular, a digital representation of a desired waveform is processed using poly-phasing techniques to cancel nonlinearity errors (via phase-offset versions of desired waveform processed via multiple paths) and time-interleaving processing techniques to cancel image errors (via a respective group of multiple radio frequency (RF) digital-to-analog converters (DACs) in each path performing the respective DAC function). Advantageously, the group of multiple RF-DACs operates in a synchronized manner as a single DAC providing tunable, wide frequency band capabilities.

An apparatus according to one embodiment comprises M phase-shifters, each phase shifter configured for receiving a digital representation of a desired waveform and generating a respective phase-shifted digital representation of the desired waveform, wherein the phase-shifted digital representations are phase-separated by 360°/M, where M is an integer greater than one; M groups of time-interleaved (TI) radio frequency (RF) digital-to-analog converters (DACs), each TI-RF-DAC group is configured to process one of the respective components (of the phase-shifted digital representation of the desired waveform) that combined, form the complete, desired phase-shifted analog signal; N mixers, where N is an integer equal to or greater than M, each mixer is configured to process one of the respective phase-shifted analog signals to reverse a phase-shift associated with that analog signal and provide thereby a respective in-phase analog signal; a combiner, to combine the M in-phase analog signals to provide a combined analog signal; and a bandpass filter, for passing spectra associated with a sideband of the combined analog signal to provide thereby a band-limited analog signal suitable for transmission.

A method of digital to analog signal conversion according to one embodiment comprises: at each of M phase-shifters, in response to receiving a digital representation of a desired waveform, generating a respective phase-shifted digital representation of the desired waveform, wherein the phase-shifted digital representations are phase-separated by 360°/M, where M is an integer greater than one; at each of M groups of time-interleaved (TI) radiofrequency (RF) digital-to-analog converters (DACs), processing a respective one of the phase-shifted digital representations of the desired waveform to provide thereby a respective phase-shifted analog signal component, each phase-shifted analog signal component forming a portion of a desired phase-shifted analog signal; at each of N mixers, where N is an integer equal to or greater than M, processing one of the respective phase-shifted analog signals to reverse a phase-shift associated with that analog signal and provide thereby a respective in-phase analog signal; at a combiner, combining the M in-phase analog signal to provide a combined analog signal; and at a bandpass filter, processing the combined analog signal to pass spectra associated with a sideband of the combined analog signal to provide thereby a band-limited analog signal suitable for transmission.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWING

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
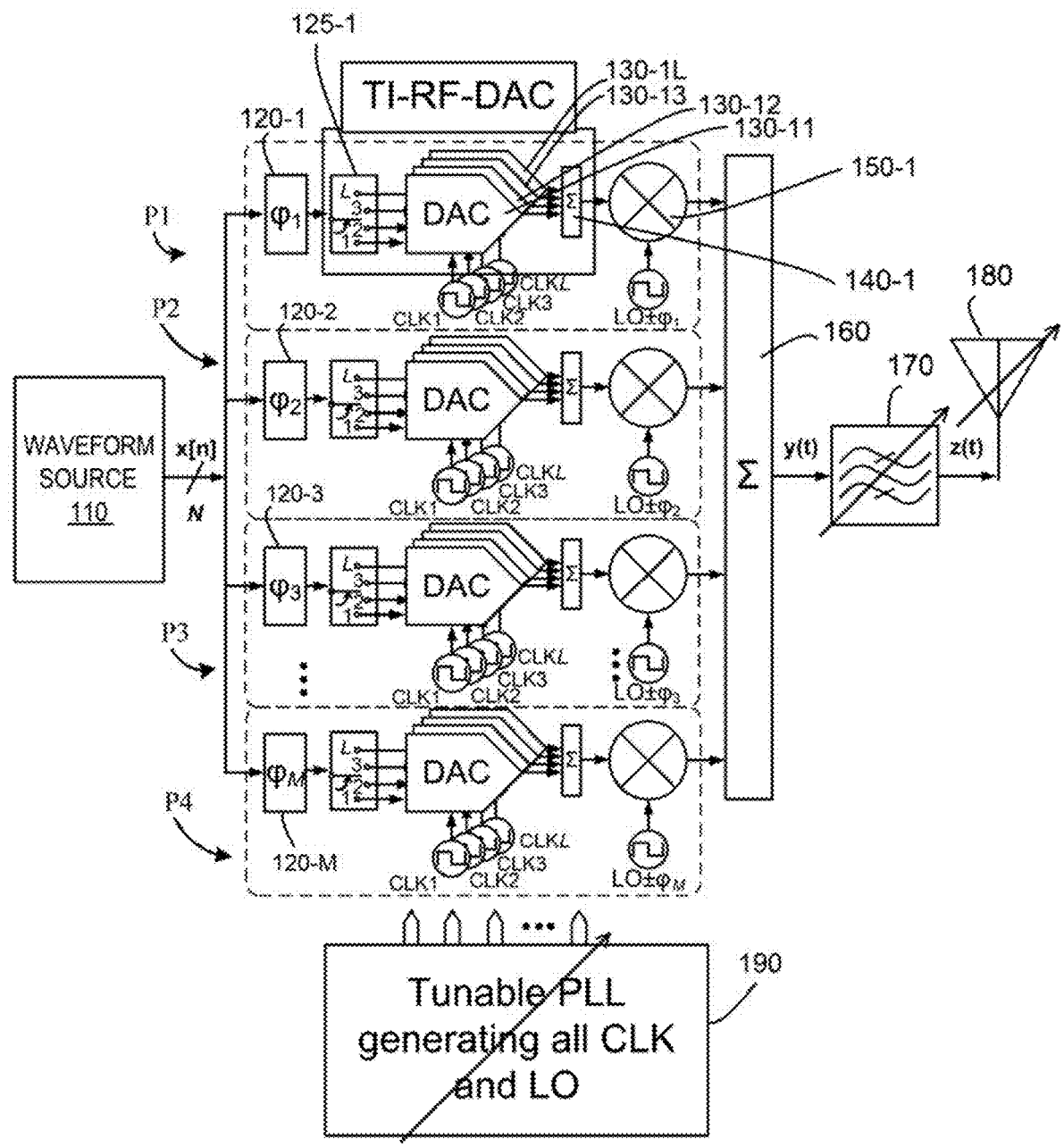
FIG. 1 depicts a block diagram of a system according to one embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventors to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a poly-phased, time-interleaved radio frequency (RF) digital-to-analog converter (DAC) suitable for use in radar, radio, mobile and other RF systems benefiting from a reduced level of spectral artifacts such an non-linearity, imaging and the like while avoiding the use of large discrete passive filtering components (i.e., the embodiments may be implemented using standard chip fabrication techniques). In particular, a digital representation of a desired waveform is processed using poly-phasing techniques to cancel nonlinearity errors (via phase-offset versions of desired waveform processed via multiple paths) and time-interleaving techniques processing to cancel image errors (via a respective group of multiple RF-DACS in each path performing the respective DAC function).

Various embodiments comprise a RF-DAC that performs image, sideband, clocking feedthrough, and nonlinearity cancelling within digital-to-analog converters and mixers, thus offering a cleaner and sparser frequency spectrum for operation. In this manner, one transmitter may be used to support a very large operating frequency range, resulting in a decrease in size, weight, power consumption and cost when implemented as part of a small platform system.

Various embodiments contemplate a frequency-agile (potentially power-agile) approach to implementing a radio transmitter while avoiding or reducing issues such as image replicas, clocking leakage, nonlinearities, and undesired sidebands. An architecture according to various embodiments utilizes techniques in image replica and nonlinearity cancelling as well as suppressions of local oscillator (LO) feedthrough and sidebands to generate a clean and sparse frequency spectrum. In addition to these techniques, tunable and reconfigurable signal synthesizers, LO generators, and bandpass filtering offer the frequency agility primarily limited by available fabrication technologies and not by design. Other advantages include low design cycle time, open architecture designs for system longevity, and ease of transition from one technology to the next. The various embodiments may be configured to allow for simultaneous transmission of communication and radar signals through the same broadband antenna and with multiple channels providing various transmit powers.

Various embodiments of the presented architecture may be optimized for system-on-a-chip (SoC) fabrication in commercially available integrated circuit processes, and may be developed in a hybrid design sequence via a mixing of various integrated circuit processes such as silicon and III-V.

Generally speaking, the various embodiments provide a poly-phased, time-interleaved digital-to-analog converter advantageously using digital in-phase and quadrature-phase (I/Q) signal up-conversion, data-and-hold interleaving, poly-phasing and/or other techniques as described herein to cancel unwanted image replicas, sidebands, local oscillator feedthrough, and nonlinearities as will be discussed in more detail below.

FIG. 1 depicts a block diagram of a system according to one embodiment. Specifically, the system 100 of FIG. 1 is configured to process a digital representation of one or more waveforms of interest (e.g., a radar signal, radio signal, communications signal, network transmission and the like) to produce output signal(s) suitable for transmission such as via an antenna, optical fiber or other RF transmission mechanism.

Waveforms of interest may be independent of each other or related to each other. For example, related waveforms of interest may comprise in-phase and quadrature data (I/Q) representations of a baseband signal of interest, which representations are suitable for use in various known modulation/transmission schemes using two orthogonal transmission channels (i.e., in-phase and quadrature-phase, I and Q) such as Quadrature Phase-Shift Keying (QPSK), Quadrature Amplitude Modulation (QAM), Orthogonal Frequency Division Multiplexing (OFDM) and other modulation schemes.

Referring to FIG. 1, a waveform source 110 provides a digital representation of a waveform of interest x[n], which waveform is coupled to M poly-phasing paths (illustratively four paths denoted as P1-P4). The waveform source 110 may comprise an arbitrary waveform generator, radar signal source, radio signal source, communications signal source, I/Q signal source or, more broadly, any digital baseband process configured to synthesize a digital representation of one or more waveforms to be generated, such as QPSK, QAM, OFDM, linear frequency modulation (LFM) and/or other waveforms.

Each of the M=4 poly-phasing paths P1-P4 depicted in FIG. 1 comprises a respective phase shifting element configured to generate a respective one of the M=4 phase-shifted digital representations of the desired waveform, wherein the phase-shifted digital representations of the desired waveform are phase-separated by 360°/M Specifically, phase shifting elements 120-1 through 120-M shift the phase of respective received waveforms of interest (or portions thereof) by 0° (first path P1), 90° (second path P2), 180° (third path P3) and 270° (fourth or Mth path P4). That is, the phase angle of the M poly-phasing paths is determined with respect to M.

Each of the M=4 poly-phasing paths depicted in FIG. 1 is configured for processing the respective phase-shifted version of the desired waveform (or portions thereof) to provide respective phase-shifted analog representations of the desired waveform (or portion thereof). The digital-to-analog conversion comprises weighting and summing of voltages, charges, or currents derived from input digital codes. It is noted that among the different DAC topologies, the current-steering architecture remains a preferred choice for high speed applications. In this architecture, an analog value (typically in the voltage domain) is produced, wherein the current-steering DACs use resistors ($R_L$) to convert the current to a representative voltage, $V_{OUT}$.

Each of the M=4 poly-phasing paths depicted in FIG. 1 comprises a respective time-interleaved (TI) radiofrequency (RF) digital-to-analog converters (DACs) or TI-RF-DAC. Referring to first path P1, the TI-RF-DAC comprises a time interleaving selector 125-1 configured to couple the output of phase shifting element 120-1 to each of a group of L DACs 130-1 through 130-L, where L=4. Each of the L=4 DACs is driven by a respective clock signal (denoted as CLK1 through CLKL) and provides a respective analog output signal to analog summing/combining element 140-1 configured for summing the L=4 analog output signals to generate thereby a summed or combined TI-RF-DACs DAC output signal. For example, in the case each of the respective L DACS comprises a current steering DAC, the summing/combining element may comprise a simple node at which the current outputs of the L DACS are added/subtracted from each other. In the case each of the respective L DACS comprising voltage output DACs, the summing/combining element 140 comprises a circuit configured to combine the L output voltages to form a combined output signal, which is coupled to a mixer 150-1 configured for mixing the combined output signal with a respective phase shifted local oscillator (LO) signal, where the phase shift of the LO signal is selected to negate the initial phase shift imparted by phase shifting element 120-1 to provide a phase-corrected path P1 output signal. For example, the first path P1 mixer 150-1 may use a square wave LO signal to multiply the summed or combined P1 TI-RF-DAC output signal by −1 for half of each update period and +1 for the other half or each update period to achiever thereby the selected phase shift.

As shown in FIG. 1, the various elements of first path P1 are substantially the same as those of each of the remaining paths P2 through PM, and each of these remaining paths generates a respective phase-corrected output signal.

The phase-corrected output signals of each of the M=4 poly-phasing paths are coupled to an analog summing/combining element 160 configured to generate therefrom a combined signal of interest, y(t), which is processed via a filter 170 to generate thereby a filtered signal of interest, z(t), which is then transmitted via, illustratively, an antenna 180.

In various embodiments, one or both of the filter 170 and antenna 180 may be adjustable such that specific tuning/filtering functions may be used to process, respectively, signals y(t) and z(t).

In various embodiments, a tunable phase-locked loop (PLL) 190 is used to generate the various clock and/or local oscillator signals used within the system 100. It is contemplated that the PLL 190 or other local oscillator may comprise an on-chip device and/or an off-chip device.

The above-described 4×4 (M×L) implementation is accomplished by arraying and summing four time-interleaved digital-to-analog converters (DACs) per each of the four poly-phased paths to achieve thereby high-frequency radio frequency (RF) signal synthesis. In the digital domain, a desired signal x (either a single tone or a frequency band) is generated via up-sampling by the number of time-interleaved (TI)-RF-DACs (e.g. four). This is followed by low-pass filtering with the Q-path traversing a Hilbert transform and an amplitude matching amplifier providing phase shifting and gain balancing, respectively. While remaining in the digital realm, the I/Q signals are up-converted to a desired intermediate frequency (IF).

It is important to note that the phase-change is constant across all frequencies within the frequency band. For each poly-phased path, the available four samples are selected with respect to the phase of the time-interleaved digital-to-analog converters' clocking phase and held for the duration of $T_{CLK}$. For example, if one of the four time-interleaved radio frequency digital-to-analog converters (TI-RF-DACs) has a clocking phase of $T_{CLK}/4$, then that DAC will receive sample 1, while the next TI-RF-DAC will have a phase of $T_{CLK}/2$ receiving sample 2, and so on. During this process, the TI-RF-DACs provide image cancellation and with the embedded switching mixer, frequency translation.

Depending upon the choice of the phase sign (for all of the local oscillators (LOs) across the poly-phased paths), either the lower sideband (LSB) or the upper sideband (USB) will be available, thus providing nonlinearity cancellation and sideband suppression. By canceling the digital-to-analog (DAC) images and suppressing the sideband, the various embodiments enable less cluttered up-conversion, thereby extending the usable bandwidths and reducing stringent filter requirements.

Thus, the various embodiments discussed above with respect to FIG. 1 provide a poly-phasing time-interleaved radio frequency digital-to-analog converter (Poly-TI-RF-DAC) having M-poly-phasing paths, each path formed with L-time-interleaved DACs.

The various embodiments discussed herein may be modified in accordance with additional use cases, additional digital-to-analog converter (DAC) types, additional modulation types/schemes, additional baseband waveforms of interest and so on. Therefore, it will be appreciated by those skilled in the art that the main specification, figures and the like should be viewed within the context of both supporting and extending embodiments described herein.

In various embodiments, the poly-phasing time-interleaved radio frequency digital-to-analog converter (Poly-TI-RF-DAC) of FIG. 1 may build upon a digital intermediate frequency (IF) architecture, leveraging the advantages of built-in digital I/Q and up-conversion, data-and-hold interleaving, and poly-phasing, thereby canceling unwanted image replicas, sidebands, and nonlinearities.

Classically, I/Q inputs are readily available and preferred for modulation; therefore, a 4×4 poly-phasing time-interleaved radio frequency digital-to-analog converter (Poly-TI-RF-DAC) will be used for illustration within the chapter. The 4×4 implementation is accomplished by arraying and summing four time-interleaved DACs per each of the four poly-phased paths, as illustrated in FIG. 1, to achieve high-frequency RF signal synthesis. In the digital domain, the desired signal x (either a single tone or a frequency band) is generated via up-sampling by the number L of TI-DACs (e.g., 4). This is followed by low-pass filtering with the Q-path traversing a Hilbert transform and an amplitude matching amplifier providing phase shifting and gain balancing, respectively. While remaining in the digital realm, the I/Q signals are up-converted to the desired intermediate frequency (IF). It is important to note that the phase-change is constant across all frequencies within the frequency band. For each poly-phased path, the available four samples are selected with respect to the phase of the TI-DACs' clocking phase and held for the duration of $T_{CLK}$. For example, if one of the four DACs has a clocking phase of $T_{CLK}=4$, then that DAC will receive sample 1, while the next DAC will have a phase of $T_{CLK}=2$ receiving sample 2, and so on. During this process, the DACs provide image cancellation and, with the embedded switching mixer, frequency translation. Depending on the choice of the phase sign (for all of the LOs across the poly-phased paths), either the lower sideband (LSB) or the upper sideband (USB) will be available, thus providing nonlinearity cancellation and sideband suppression. By canceling the DAC images and suppressing the sideband, the proposed design enables less cluttered up-conversion, thereby extending the usable bandwidths and reducing stringent filter requirements.

As described herein, the apparatus of FIG. 1 may comprise M phase-shifters, each phase shifter configured for receiving a digital representation of a desired waveform and generating a respective phase-shifted digital representation of the desired waveform, wherein the phase-shifted digital representations are phase-separated by 360°/M, where M is an integer greater than one; M groups of time-interleaved (TI) radio frequency (RF) digital-to-analog converters (DACs), each TI-RF-DAC group is configured to process one of the respective components (of the phase-shifted digital representation of the desired waveform) that combined, form the complete, desired phase-shifted analog signal; N mixers, where N is an integer equal to or greater than M, each mixer is configured to process one of the respective phase-shifted analog signals to reverse a phase-shift associated with that analog signal and provide thereby a respective in-phase analog signal; a combiner, to combine the M in-phase analog signals to provide a combined analog signal; and a bandpass filter, for passing spectra associated with a sideband of the combined analog signal to provide thereby a band-limited analog signal suitable for transmission. It is noted that the number of mixers N is equal to the number of TI-RF-DAC groups if one mixer is allocated to each TI-RF-DAC group. However, in various embodiments, individual TI-RF-DACs may be implemented with a respective mixer, sub-groups of TI-RF-DACs forming a group may be implemented with respective mixers and so on. In these embodiments, the number of mixers N is greater than M.

As described herein, FIG. 1 depicts a method of digital to analog signal conversion, comprising, in one embodiment, at each of M phase-shifters, in response to receiving a digital representation of a desired waveform, generating a respective phase-shifted digital representation of the desired waveform, wherein the phase-shifted digital representations are phase-separated by 360°/M, where M is an integer greater than one; at each of M groups of time-interleaved (TI) radiofrequency (RF) digital-to-analog converters (DACs), processing a respective one of the phase-shifted digital representations of the desired waveform to provide thereby a respective phase-shifted analog signal component, each phase-shifted analog signal component forming a portion of a desired phase-shifted analog signal; at each of N mixers, where N is an integer equal to or greater than M, processing one of the respective phase-shifted analog signals to reverse a phase-shift associated with that analog signal and provide thereby a respective in-phase analog signal; at a combiner, combining the M in-phase analog signal to provide a combined analog signal; and at a bandpass filter, processing the combined analog signal to pass spectra associated with a sideband of the combined analog signal to provide thereby a band-limited analog signal suitable for transmission.

Figure 2:
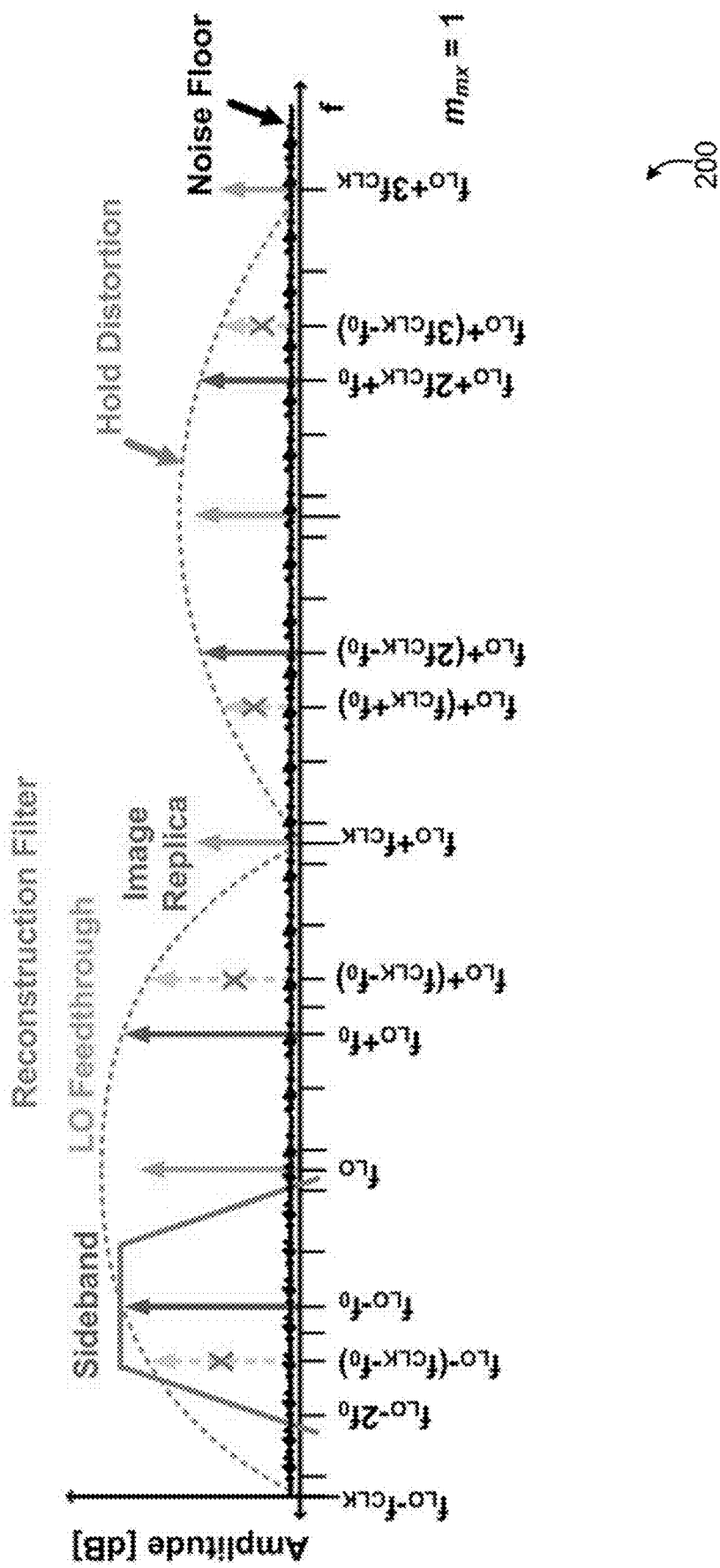
FIG. 2 graphically depicts output spectra of a single time-interleaved (TI) radio frequency (RF) digital-to-analog converters (DAC) such as described with respect to the system of FIG. 1.
Figure 3:
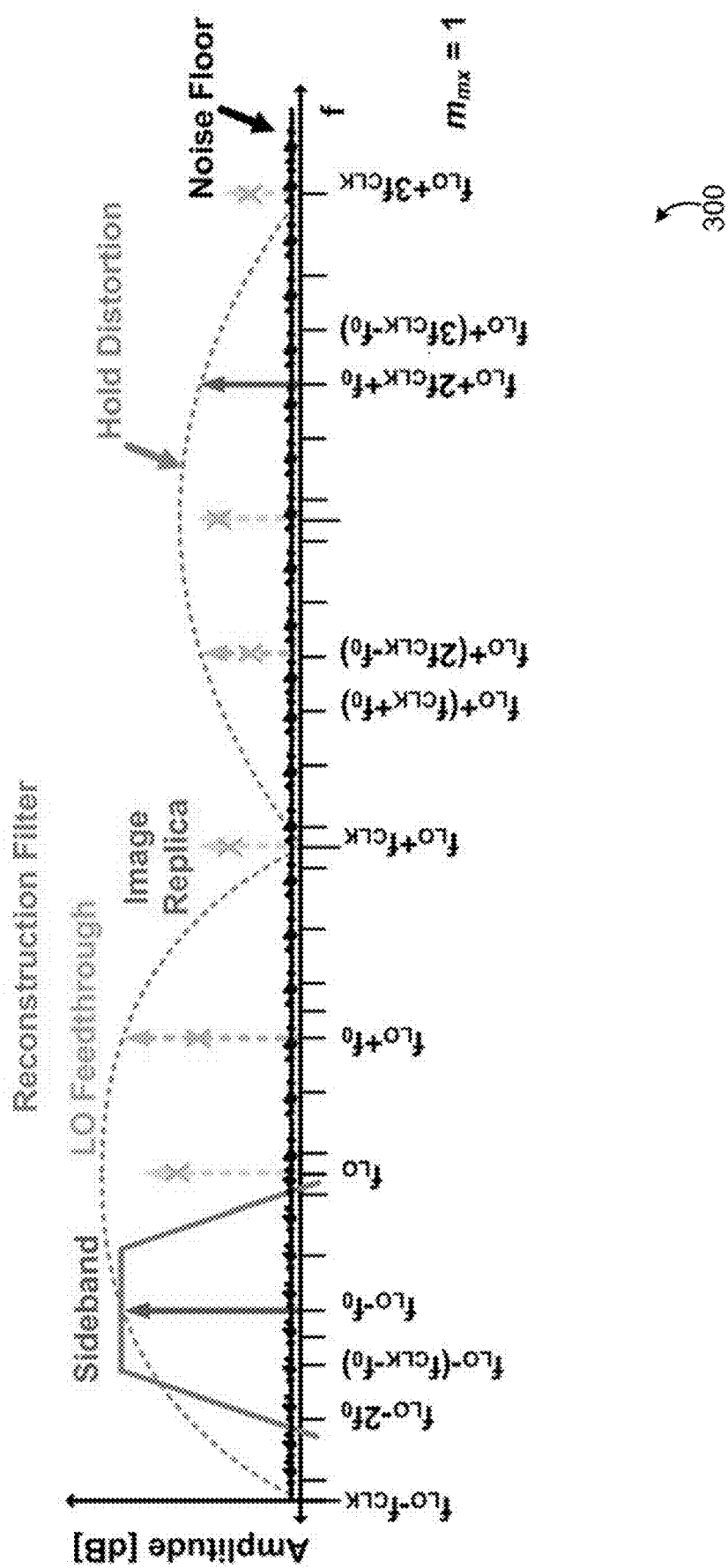
FIG. 3 graphically depicts output spectra of a combined signal of interest such as described with respect to the system of FIG. 1.

FIGS. 2-3 graphically depict the spectral outputs at various stages of the poly-phasing time-interleaved radio frequency digital-to-analog converter (Poly-TI-RF-DAC), spectra associated with the system 100 of FIG. 1.

FIG. 2 graphically depicts output spectra of a single time-interleaved (TI) radiofrequency (RF) digital-to-analog converters (DAC) such as described with respect to the system of FIG. 1. Specifically, FIG. 2 graphically depicts exemplary output spectra of a summed TI-RF-DACs DAC output signal as generated by an analog summing/combining element 140 as described above with respect to FIG. 1.

FIG. 3 graphically depicts output spectra of a combined signal of interest such as described with respect to the system of FIG. 1. Specifically, FIG. 2 graphically depicts exemplary output spectra of a combined signal of interest y(t) such as generated by the analog summing/combining element 150 as described above with respect to FIG. 1. It is noted that the output spectra depicted in FIG. 3 illustrates cancellations of images, feedthrough, and sidebands due to time-interleaving and poly-phasing.

FIGS. 2-3 both show the anticipated hold distortions and the cancellations of the images and sideband due to the techniques of data and hold interleaving and poly-phasing respectively.

Referring to FIGS. 2-3, is noted that image pairs associated with a waveform of interest are located at $L \cdot \omega_{CLK}$ and attenuated by the nonreturn-to-zero (NRZ) sinc distortion as indicated by the following equation (EQ. 1):

$$P_{ZOH}(\omega) = \text{sinc}\left(\frac{\omega}{\omega_{CLK}}\right) \cdot e^{-j\pi \cdot \frac{\omega}{\omega_{CLK}}}$$

When representing $X(\omega)$ by the TI-RF-DAC's continuous-time Fourier transform (CTFT) and using a single-tone LO, the expression for the poly-phasing time-interleaved radio frequency digital-to-analog converter (Poly-TI-RF-DAC) may be written as the following equation (EQ. 2):

$$Z(\omega) = \frac{M \cdot L}{2} \sum_{k=0}^{M-1} \sum_{l=-\infty}^{\infty} X\left(\frac{(\omega + \omega_{LO})}{2 \cdot \pi} - \frac{L \cdot l \cdot \omega_{LO}}{2 \cdot \pi}\right) \cdot P_{ZOH}(\omega + \omega_{LO}) +$$
$$X\left(\frac{(\omega - \omega_{LO})}{2 \cdot \pi} - \frac{L \cdot l \cdot \omega_{LO}}{2 \cdot \pi}\right) \cdot P_{ZOH}(\omega - \omega_{LO}) \cdot e^{-j \cdot 4 \cdot \pi \cdot \frac{k}{M}}$$

It is noted that, when addressing a switching mixer, this analysis can be extended to a square wave that includes all odd-order harmonics of the local oscillator (LO). An important observation in this expression relates the locations of the time-interleaved digital-to-analog converter (TI-DAC) images and the mixing operation on these images. Although sideband suppression occurs due to poly-phasing, the undesired sideband may still be present because of DAC images that have mixed down (or up). Frequency planning is required to better understand how folded images from higher order $\omega_{LO}$ harmonics may add to the frequency location of the anticipated suppressed sideband. For most implementations, a minimum numbers of poly-phased paths and time-interleaved radio frequency digital-to-analog converters (TI-RF-DACs) are M=3 and L=3 that removes the sideband as well as ensures that the DAC images that fall in band are canceled.

Figure 4A:
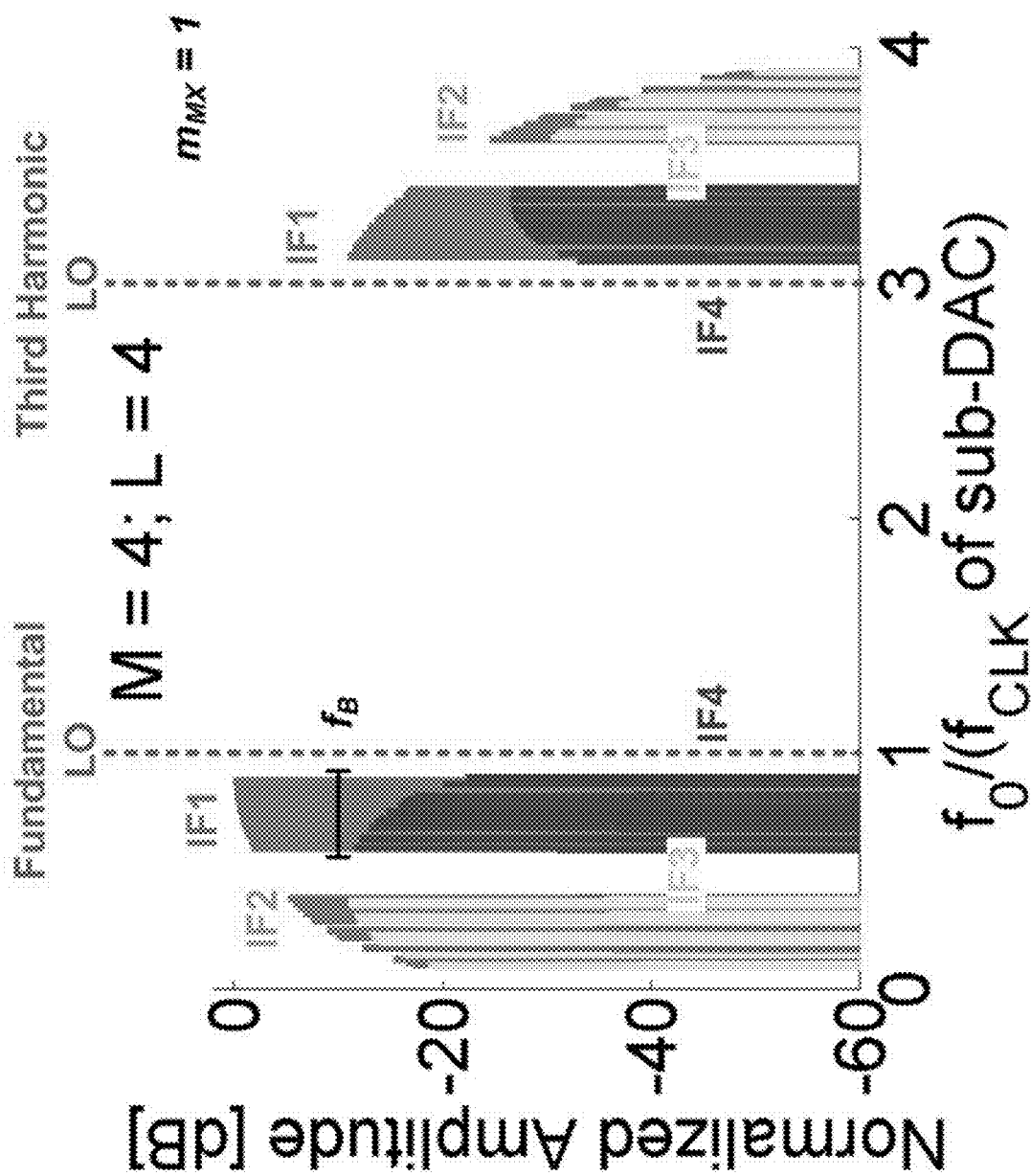
FIGS. 4A-4B graphically depict output spectra of a 4×4 poly-phased, time-interleaved radio frequency digital-to-analog converter (Poly-TI-RF-DAC) with $m_{mx}=1$ and $m_{mx}=2$.
Figure 4B:
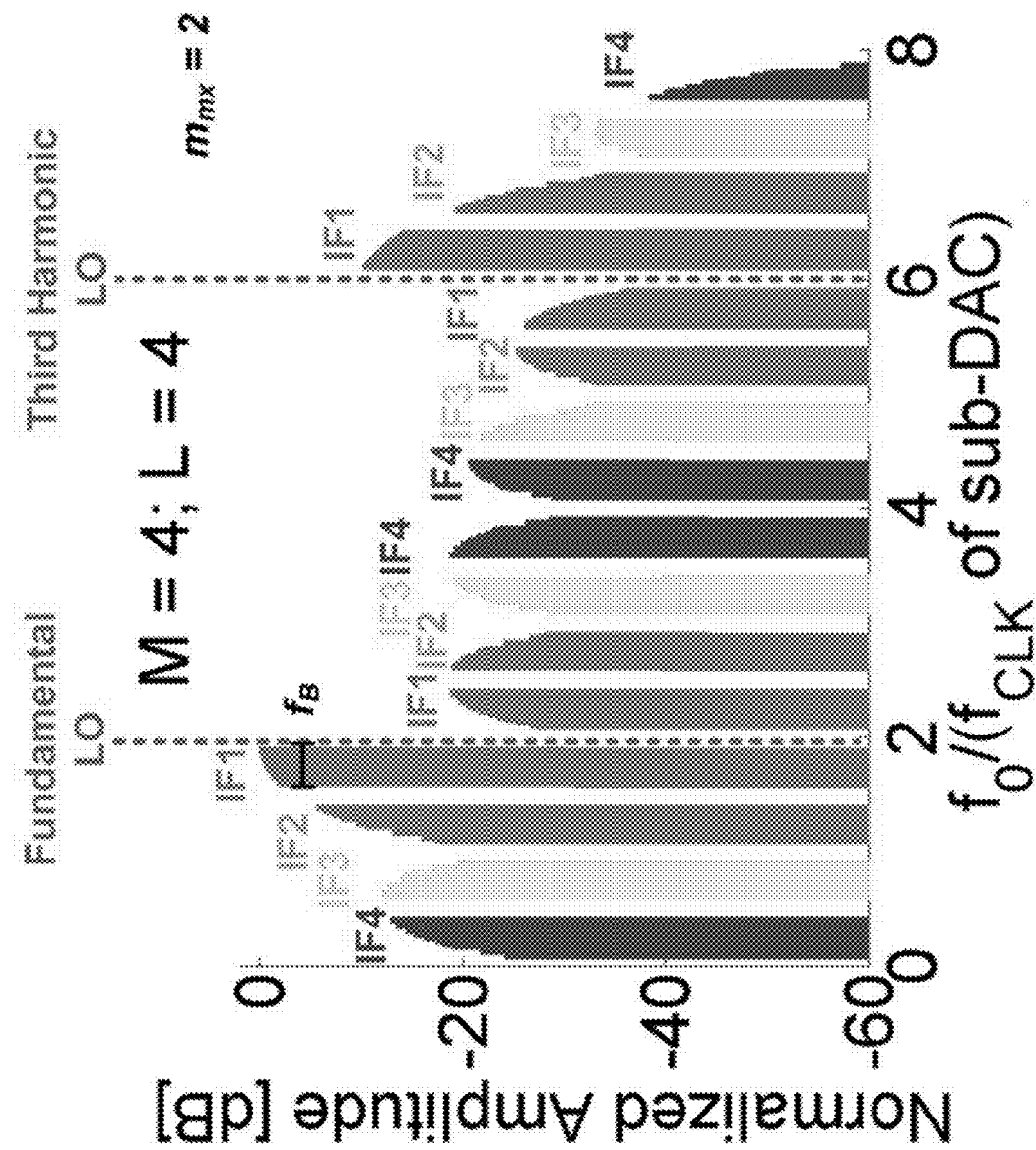

An interesting capability of multiple concurrent signal generations at various output powers within the same Nyquist zones is also available. FIGS. 4A-4B illustrate two examples of the output spectra of the 4×4 poly-phasing time-interleaved radio frequency digital-to-analog converter (Poly-TI-RF-DAC) with $m_{mx}=1$ and $m_{mx}=2$. In both plots, IF1, IF2, IF3, and IF4 represent unique bandwidths that are generated in the 4 unique Nyquist Zones of the TI-DAC. These signals are then up-converted and depending on the mmx value, these bandwidths can occupy unique frequency bands or the same frequency band allowing for different signals to be transmitted concurrently. By changing the $m_{mx}$ value, the signal originally generated in the first Nyquist zone of a single DAC has sideband cancellation if $m_{mx}=1$ and an effective sideband suppression if $m_{mx}=2$. Even though there is sideband cancellation due to the number of poly-phased paths, a higher frequency DAC image mixes down and re-establishes the sideband. For example, a 4-TI-DAC has image pairs around $4 \cdot f_{CLK}$, and the image at $(4 \cdot f_{CLK} - f_0)$ is mixed down in place of the canceled sideband $f_{LO}+f_0$.

Figure 5:
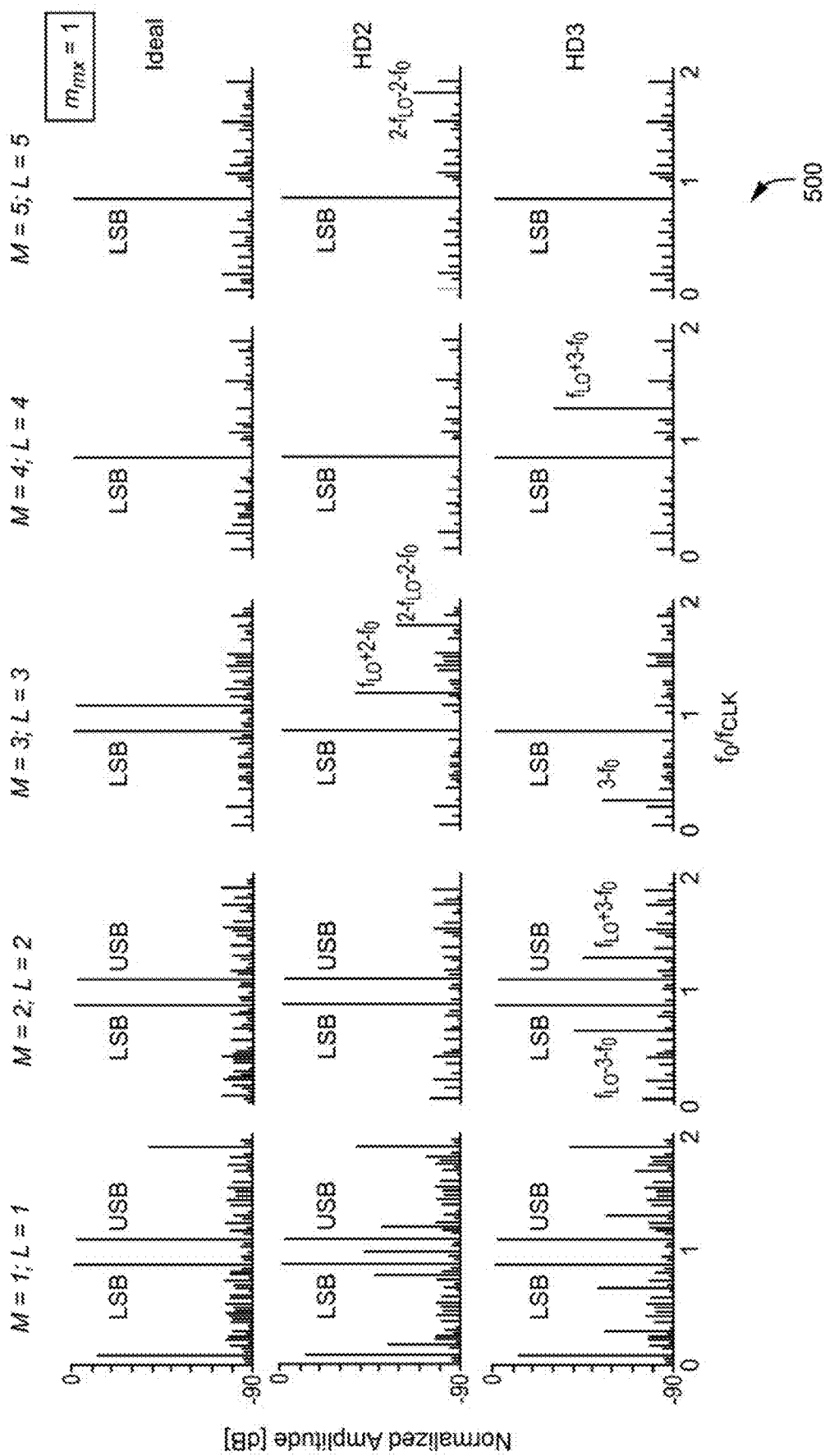
FIGS. 5-6 graphically depict spectra associated with different matrices of M=L poly-phased, time-interleaved radio frequency digital-to-analog converter (Poly-TI-RF-DAC) configurations with $m_{mx}=1$ and $m_{mx}=2$.
Figure 6:
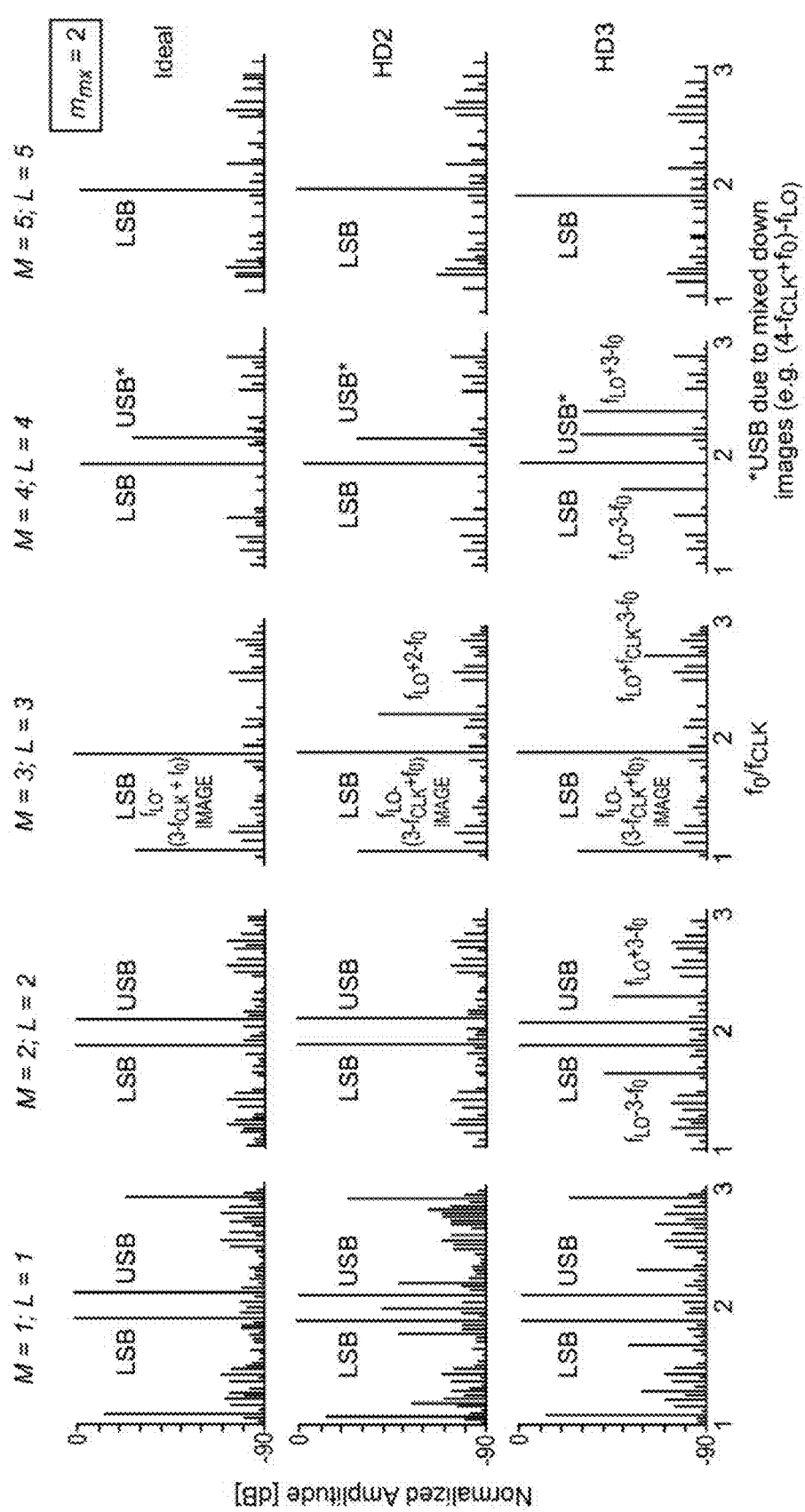

In various embodiments, in order to provide a breadth of configurations, FIGS. 5-6 show five M=L configurations with two stacked subplots at $m_{mx}=1$ and $m_{mx}=2$. In particular, FIG. 5 illustrates the locations of the images and sidebands and identifies USB cancellations for IF1 and multi-Nyquist signal generation across the fundamental and third harmonic of the LO. Similar to conventional nonreturn-to-zero (NRZ) and return-to-zero (RZ) digital-to-analog converters (DACs), other images and sidebands can be used to generate higher frequency signals, thereby not requiring higher CLK and local oscillator (LO) frequencies. The poly-phasing time-interleaved radio frequency digital-to-analog converter (Poly-TI-RF-DAC) leverages the advantages of the TI-DACs in canceling the DAC image replicas and poly-phasing in canceling the mixing sidebands. In addition, the two techniques combined offer non-linearity cancellation that would normally clutter the spectrum of a stand-alone DAC, thus reducing the filtering requirements at the DAC output as illustrated in FIGS. 5-6.

Specifically, FIGS. 5-6 graphically depict spectra associated with different matrices of M=L poly-phasing time-interleaved radio frequency digital-to-analog converter (Poly-TI-RF-DAC) configurations illustrating the effects of cancellations for images, sidebands, local oscillator (LO) leakage, second-order (HD2) and third-order (HD3) harmonic distortions versus two different $m_{mx}$ values. The figures are annotated with the remaining signals that are not canceled or have been re-established and their contributors. For example in FIG. 6, the HD3 for the 4×4 configuration clarifies that the sideband is re-established and because it is now available, the third order harmonic remains. Therefore, knowing whether a sideband is re-created or images fold into the band of interest, will affect which nonlinearities are canceled.

The following Tables are useful in understanding the various embodiments.

Table 1 depicts the phase of c-th harmonic of intermediate frequency (IF) Signal mixed with a-th harmonic of the local oscillator (LO) signal just before summation in a poly-phased circuit with mixers as the second phase shifter where the lower sideband is desired.

Table 2 indicates whether harmonics are canceled (X) or not (BLANK) depending on their phase (columns) and number of paths (rows) where φ is uniformly divided across 360°

TABLE 1

|   | c | | | | | | | | | | |
|---|---|---|---|---|---|---|---|---|---|---|---|
| a | −5 | −4 | −3 | −2 | −1 | 0 | 1 | 2 | 3 | 4 | 5 |
| 0 | −5φ | −4φ | −3φ | −2φ | −1φ | 0 | −1φ | −2φ | −3φ | −4φ | −5φ |
| 1 | −4φ | −3φ | −2φ | −1φ | 0 | −1φ | −2φ | −3φ | −4φ | −5φ | −6φ |
| 2 | −3φ | −2φ | −1φ | 0 | 1φ | −2φ | −3φ | −4φ | −5φ | −6φ | −7φ |
| 3 | −2φ | −1φ | 0 | 1φ | 2φ | −3φ | −4φ | −5φ | −6φ | −7φ | −8φ |
| 4 | −1φ | 0 | 1φ | 2φ | 3φ | −4φ | −5φ | −6φ | −7φ | −8φ | −9φ |
| 5 | 0 | 1φ | 2φ | 3φ | 4φ | −5φ | −6φ | −7φ | −8φ | −9φ | −10φ |

TABLE 2

| M | 0 | ±1φ | ±2φ | ±3φ | ±4φ | ±5φ | ±6φ | ±7φ | ±8φ | ±9φ | ±10φ |
|---|---|-----|-----|-----|-----|-----|-----|-----|-----|-----|------|
| 1 |   |     |     |     |     |     |     |     |     |     |      |
| 2 |   | X   |     | X   |     | X   |     | X   |     | X   |      |
| 3 |   | X   | X   |     | X   | X   |     | X   | X   |     | X    |
| 4 |   | X   | X   | X   |     | X   | X   | X   |     | X   | X    |
| 5 |   | X   | X   | X   | X   |     | X   | X   | X   | X   |      |

The combination of Tables 1 and 2 may be used when determining if a nonlinearity will be canceled. Since there is an integer relationship between the local oscillator (LO) and CLK, the value of $f_{Lo}$ can be combined with $f_{CLK}$ and can be treated as an overall a value in the tables. For example, with M=3 and L=3 in FIG. 6, it can be seen by inspection that a third-order harmonic that was mixed up to $f_{LO}+(f_{CLK}-3 \cdot f_0)$. Using the previous tables, a is now equal to 3. With a 2×2 implementation, the sideband is not suppressed or canceled as predicted by prior analyses; however, with the 3×3, 4×4, and the 5×5, the sideband is suppressed. Also with these variants, the nonlinearities are removed from the band of interest. Most harmonically related nonlinearities can be canceled using these methods and the appropriate choices of M and L.

As an example, with $f_{LO}=m_{mx} \cdot f_{CLK}$ of a sub-digital-to-analog converter (sub-DAC) and while referring to FIGS. 1 and 4, for the 4×4 example, assume that $2^{nd}$ and $3^{rd}$ harmonics are present for both the DACs and the mixers. FIGS. 5-6 illustrate which nonlinearities are canceled due to either or both of time-interleaving or poly-phasing. From the image, the final spectrum is cleared by the help of both techniques.

The system 100 is configured for arraying and summing L time-interleaved radio frequency digital-to-analog converters (TI-DACs) (illustratively four) per each of the M poly-phased paths (illustratively four, P1-P4) to achieve high-frequency RF signal synthesis. Specifically, each of the M poly-phasing paths P1-P4 comprises L time-interleaved DACs (illustratively four TI-DACs). It is noted that while M is depicted herein as four, the number of poly-phasing paths may be more than four or less than four, but greater than one. Similarly, while L is depicted herein as four, the number of TI-DACs used in each poly-phasing path may be more than four or less than four. The M=L=4 embodiments discussed herein are suitable for use in processing I/Q representations of a waveform of interest. M does not need to equal L, though both M and L are integers greater than one.

The second component is the digital-to-analog converter which uses interleaving of the clocks and the input data stream to provide for image replica cancellations. The third component is the paths of poly-phase mixing that are used to suppress the undesired sideband, the local oscillator (LO) feedthrough, and nonlinearities. The fourth component is a tunable phase lock loop (PLL) that can generate the desired LO frequencies with the required tuning bandwidth so as to cover the entire desired spectrum. The PLL will also be able to generate the digital-to-analog converter update clock (CLK) and the mixers LO frequency. For the spurious content that is not cancelled a leniently specified band-pass filter may be required. Finally a broadband or tunable antenna is necessary to ensure that signals can be transmitted across any desired frequencies (bands).

The architecture also allows for concurrent signal synthesis amenable to simultaneous signal transmission within a desired frequency band (FIG. 3). In addition, the combination of interleaving and poly-phasing offer nonlinearity cancellation that would normally clutter the spectrum of a stand-alone digital-to-analog converter (DAC), thus reducing the filtering requirements at the DAC output as illustrated in FIGS. 4-5. These figures represent matrices of M=L poly-phasing time-interleaved radio frequency digital-to-analog converter (Poly-TI-RF-DAC) configurations illustrating the effects of cancellations for images, sidebands, LO leakage, second-order (HD2) and third-order (HD3) harmonic distortions versus two different integer multiples of $f_{CLK}$ (mmx) values. The figures are annotated with the remaining signals that are not canceled or have been re-established and their contributors. For example in FIG. 5, the HD3 for the 4×4 configuration clarifies that the sideband is re-established and because it is now available, the third order harmonic remains. Therefore, knowing whether a sideband is re-created or images fold into the band of interest, will affect which nonlinearities are canceled.

Mixing-DACs

Radio frequency digital-to-analog converters (RF-DACs) suitable for use as one of the plurality (L) DACs described above as forming a time-interleaved radio frequency digital-to-analog converters' (TI-RF-DACs') DAC may combine up-conversion with baseband digital-to-analog conversion and may be implemented using digital and RF integration techniques. RF-DAC architecture can be conceptualized as a non-return-to-zero (NRZ) DAC followed by multiplication with a local oscillator (LO) waveform. That is, the mixing-DAC multiplies the nonreturn-to-zero (NRZ) output with a −1 for half of each update period and +1 for the other half. By using a current steering DAC and employing the mixing via commutating switches in the current path, RF-DACs can eliminate the I-to-V and V-to-I translations typically present in traditional transmitters. By decoupling the DAC update rate from the up-conversion frequency, $f_{LO}$, RF-DACs manipulate the hold distortion, thereby accentuating higher frequency images and providing low-distortion RF signal generation via a bipolar signal (LO).

The final mixing-digital-to-analog converter (DAC) distortion shape and signal and image powers are accumulations of all odd order local oscillator (LO) harmonics' distortions and sums of those respectively generated images and signals. For ease of representation, the image locations have been simplified and identified for the fundamental LO frequency. Advantageously, such a topology incorporates radio frequency (RF) up-conversion within the DAC core, thereby reducing size and power requirements, eliminating the nonlinearity of multiple voltage-to-current stages, and improving transmitter re-configurability. Here, when maintaining the integer relationship between theft $f_{LO}$ and the $f_{CLK}$, all generated image replicas and sidebands due to mixing fall upon the nonreturn-to-zero (NRZ) DAC images, thus the single frequency dynamic range (SFDR) is optimal. In addition, multiple mixing (MMX) can occur during the DAC update period, allowing for higher output power at higher synthesized frequencies.

Mixing-DAC Hold Distortion Analysis

Various embodiments contemplate an understanding and prediction of the locations of image replicas and side-bands and their attenuations due to the mixing output impulse response. Hold distortion response for a mixing-digital-to-analog converter (DAC) may be derived using the following identities and definitions (EQS. 3):

Fourier Transform $$F\{g(t)\} = G(f) = \int_{-\infty}^{\infty} g(t) \cdot e^{-j \cdot 2 \cdot \pi \cdot f \cdot t} dt$$

Euler sin Function $$\sin(t) = \frac{e^{j \cdot t} - e^{-j \cdot t}}{2 \cdot j}$$

Euler cos Function $$\cos(t) = \frac{e^{j \cdot t} + e^{-j \cdot t}}{2}$$

sinc Definition $$\operatorname{sinc}(t) = \frac{\sin(\pi \cdot t)}{\pi \cdot t}$$

Exponential Sum Formula $$\sum_{n=0}^{N-1} e^{-j \cdot n \cdot x} = \frac{1 - e^{j \cdot n \cdot x}}{1 - e^{j \cdot x}} = \frac{\sin\left(\frac{1}{2} \cdot N \cdot x\right)}{\sin\left(\frac{1}{2} \cdot x\right)} \cdot e^{\frac{j \cdot x \cdot (N-1)}{2}}$$

Figure 7:
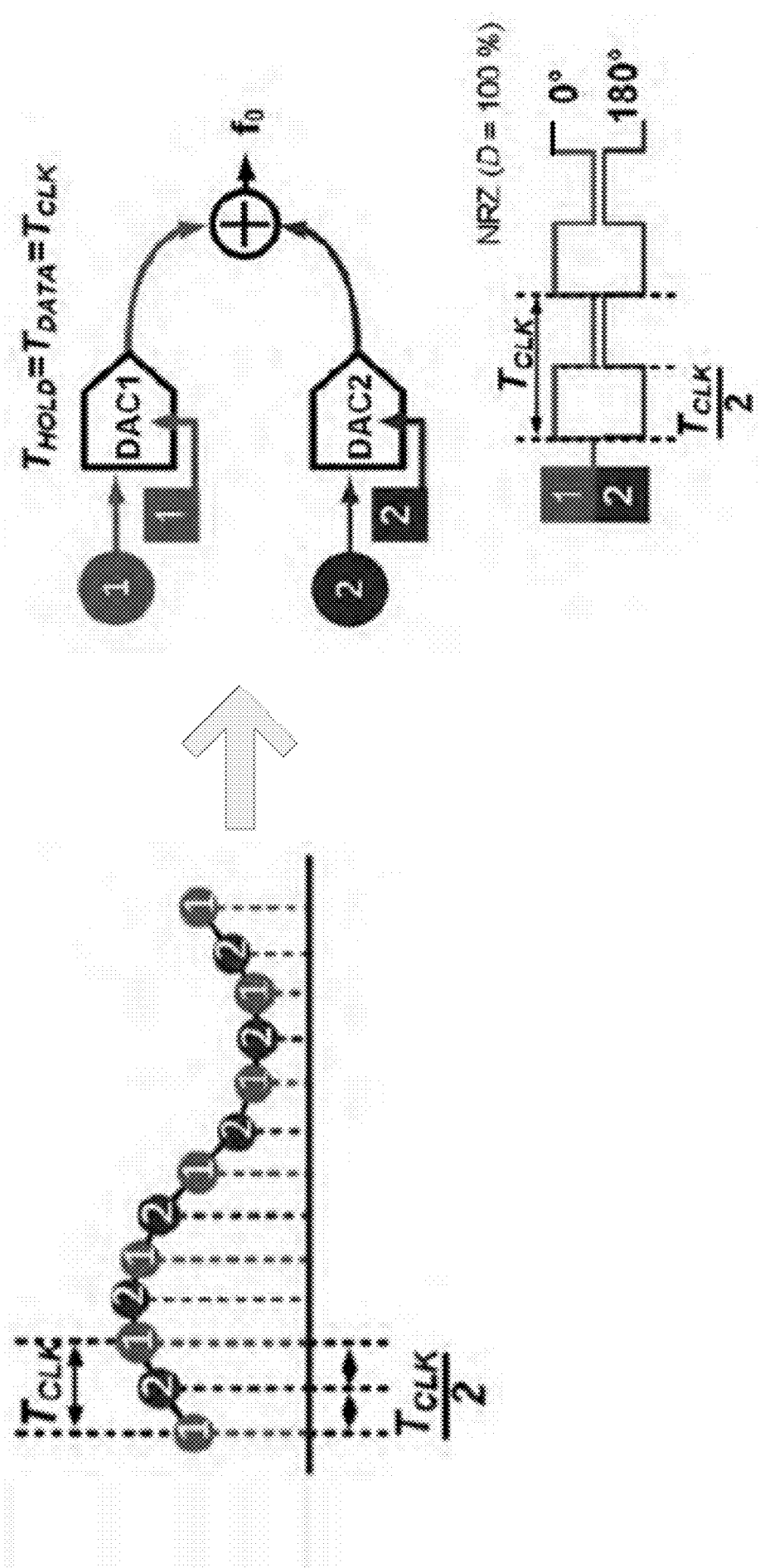
FIG. 7 graphically illustrates a L=2 data and hold interleaved digital-to-analog (DAC) in operation.
Figure 8:
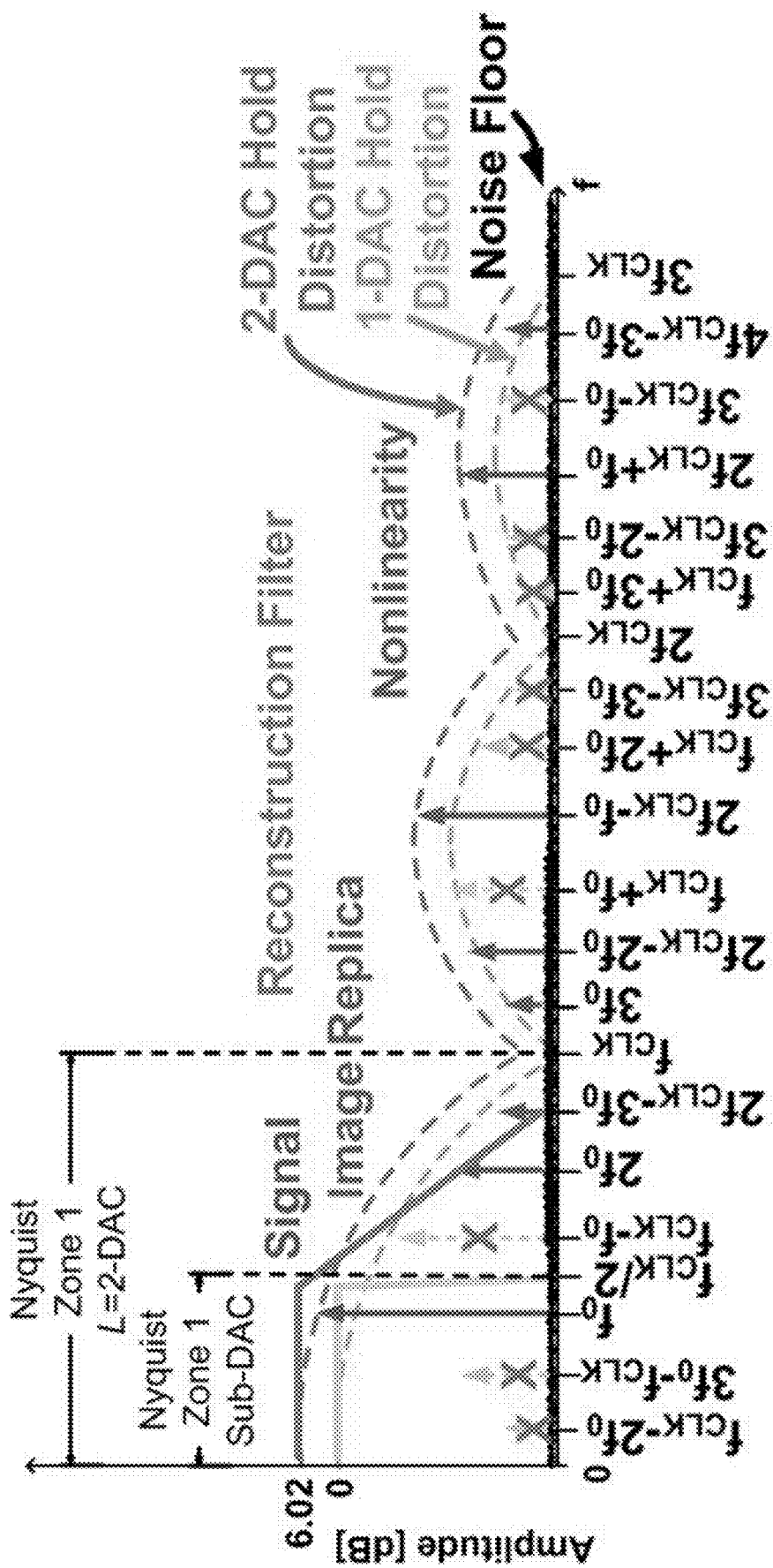
FIG. 8 graphically depicts output spectra associated with the digital-to-analog converter (DAC) of FIG. 7.

Time Shift $F\{g(t \pm t_0)\} = G(f) \cdot e^{-j \cdot 2 \cdot \pi \cdot f \cdot t}$ Time-Interleaved Digital-to-Analog Converter (TI-DAC) Using Data-and-Hold Interleaving In order to reduce the spectral clutter and extend the synthesizable bandwidth, another method for radio frequency (RF) signal generation has been proposed that time-interleaves both the data and hold operations of multiple digital-to-analog converters (DACs) to cancel image replicas. With an integer number of data and hold interleaving paths (L), the time-interleaved digital-to-analog converter (TI-DAC) can cancel up to 2·L−2 images, providing relaxed passband-to-stopband transitions, such as illustrated in FIG. 7-8. Specifically, FIG. 7 graphically illustrates a L=2 data and hold interleaved DAC in operations, while FIG. 8 graphically depicts output spectra of a DAC of FIG. 7.

The key to these image cancellations is due to the phase and sampling relationships between $f_0$ and $f_{CLK}$. In addition to image cancellation, the digital-to-analog converter (DAC) output voltage increases by a linear gain of L. A vital aspect of this architecture is the mixer removal as the DAC is directly synthesizing the signal at the target radio frequency (RF) frequency, thus eliminating a major source of nonlinearity in the transmitter. However, for direct-digital-to-RF synthesis, the images that are available at higher frequencies are still affected by the attenuating hold distortion.

Figure 9:
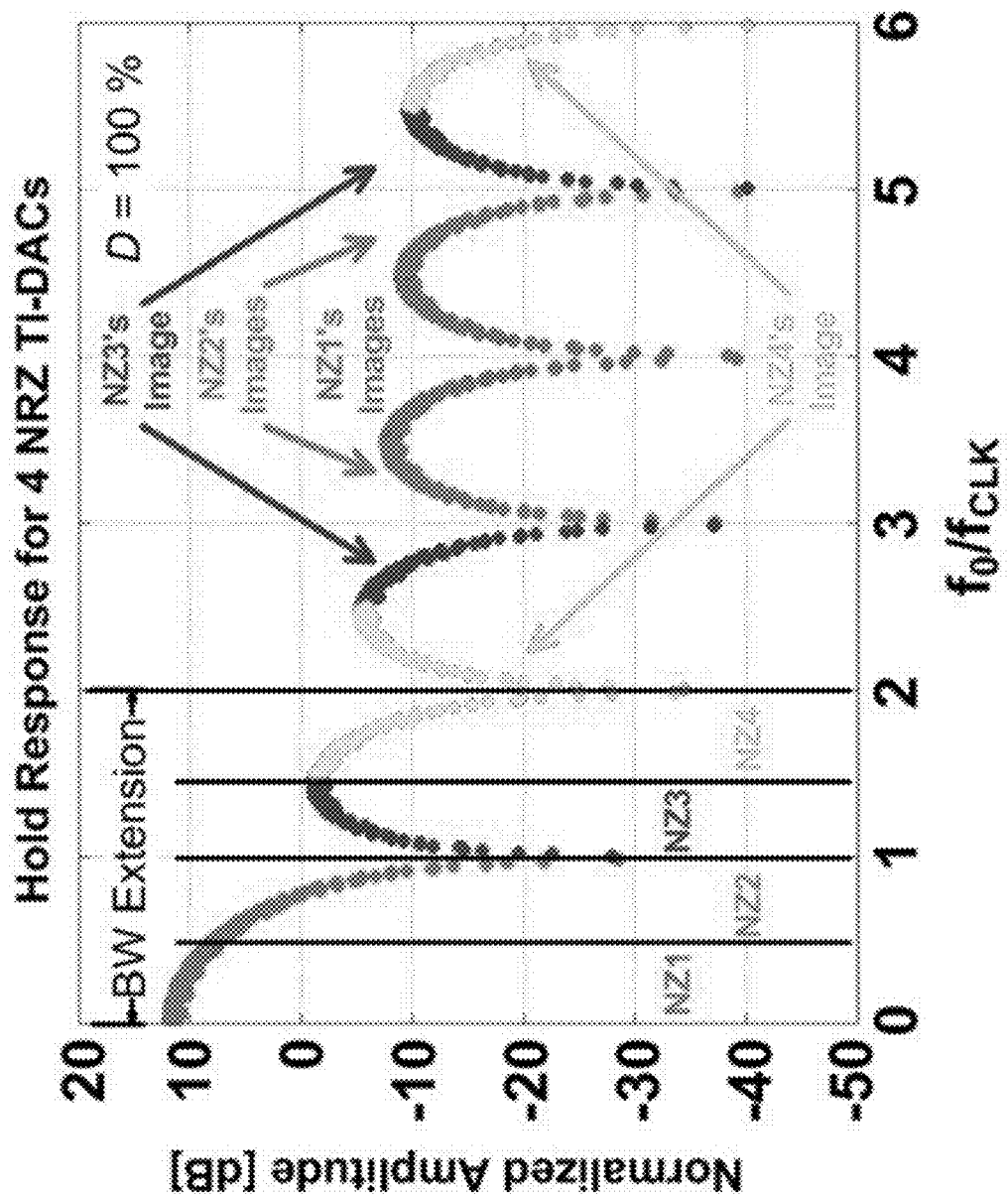
FIG. 9, graphically depicts a nonreturn-to-zero (NRZ) Hold response spectral mask of 4 data-and-hold interleaved digital-to-analog converters (DACs).

This interleaved digital-to-analog converter (DAC) can be regarded as a single DAC with an effective sample rate of $L \cdot f_{CLK}$, but because each sub-DAC's hold period is maintained for $T_{CLK}$, nulls nonetheless occur at every integer multiple of $f_{CLK}$, thereby limiting signal generation near multiples of $f_{CLK}$. In addition, the maximum achievable frequency depends on the switching limits of the DAC, the jitter of the update clock, and interleaving spurs from inter-DAC timing and amplitude mismatches. The time-interleaved digital-to-analog converter (TI-DAC frequency spectrum is described by the following equation (EQ. 4), and graphically illustrated in FIG. 9, which depicts a nonreturn-to-zero (NRZ) Hold response spectral mask of 4 data-and-hold interleaved DACs showing bandwidth extension wherein allowing for unique signal synthesis in the four Nyquist Zones.

$$H_{TIDAC,NRZ}(f, L, T_{CLK}) = L \cdot \sum_{l=-\infty}^{\infty} X\left(f - \frac{L \cdot l}{T_{CLK}}\right) \cdot D \cdot T_{CLK} \cdot \operatorname{sinc}(f \cdot D \cdot T_{CLK}) \cdot e^{-j \cdot \pi \cdot f \cdot D \cdot T_{CLK}}$$

For example, with L=4, the image replica pairs occur around every $L \cdot f_{CLK}$ for a desired signal generated in the first Nyquist zone. D is the duty cycle at the digital-to-analog converter (DAC) output. This approach extends the bandwidth of the DAC allowing for unique signal syntheses in L sub-DAC Nyquist zones by programming the digital baseband signal feeding the TI-DAC. Due to the time-interleaved digital-to-analog converter's (TI-DAC's) image cancellation, no other images are available near the NZ1. A second unique signal can be generated in the second Nyquist zone denoted by NZ2, and a third unique signal in the third Nyquist zone denoted by NZ3, etc. In the zones where the TI-DAC's response coincides with nulls, the bandwidth of the signals may need to be reduced to allow for usable signal power.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An apparatus, comprising:
   M phase-shifters, each phase shifter configured for receiving a digital representation of a desired waveform and generating a respective phase-shifted digital representation of the desired waveform, wherein the phase-shifted digital representations are phase-separated by 360°/M, where M is an integer greater than one;
   M groups of time-interleaved (TI) radio frequency (RF) digital-to-analog converters (DACs), each TI-RF-DAC group being configured to process a respective one of the phase-shifted digital representations of the desired waveform to provide thereby a respective phase-shifted analog signal component, each phase-shifted analog signal component forming a portion of a desired phase-shifted analog signal;
   N mixers, where N is an integer equal to or greater than M, each mixer is configured to process one of the respective phase-shifted analog signals to reverse a phase-shift associated with that analog signal and provide thereby a respective in-phase analog signal;
   a combiner, to combine the M in-phase analog signals to provide a combined analog signal; and
   a bandpass filter, for passing spectra associated with a sideband of the combined analog signal to provide thereby a band-limited analog signal suitable for transmission.

2. The apparatus of claim 1, further comprising an antenna for transmitting the band-limited analog signal.

3. The apparatus of claim 1, wherein each mixer mixes a respective phase-shifted analog signal with a phase offset local oscillator (LO) signal.

4. The apparatus of claim 1, wherein each TI-RF-DAC group comprises L TI-RF-DACs.

5. The apparatus of claim 4, wherein M=4 and L=4 and the desired waveform is represented by in-phase/quadrature phase (I/Q) components, and wherein the digital representation of a desired waveform provided to the M phase shifters comprises a respective one of digital waveform components I, Q, −I and −Q.

6. The apparatus of claim 5, further comprising an in-phase/quadrature phase (I/Q) modulator operative to modulate a baseband digital input signal to provide the digital waveform components I, Q, −I and −Q.

7. The apparatus of claim 6, wherein the in-phase/quadrature phase (I/Q) modulator modulated the baseband digital signal according to one of Quadrature Phase-Shift Keying (QPSK), Quadrature Amplitude Modulation (QAM) and Orthogonal Frequency Division Multiplexing (OFDM).

8. The apparatus of claim 6, wherein the baseband digital input signal comprises one of a communications signal, a radio signal, and a network transmission signal.

9. The apparatus of claim 6, wherein the apparatus comprises a software defined radio and further includes a tunable clocking module operative to configure at least one of the digital-to-analog converter (DAC) clock signals and mixer LO signals in response to a control signal.

10. The apparatus of claim 1, wherein the apparatus further comprises a direct digital synthesis (DDS) module configured to generate the digital representation of a desired waveform.

11. The apparatus of claim 1, wherein the M phase-shifters, M time-interleaved radio frequency digital-to-analog converter (TI-RF-DAC) groups, N mixers, combiner and bandpass filter are implemented on a semiconductor substrate.

12. The apparatus of claim 11, wherein the bandpass filter comprises a tunable filter formed as a plurality of selectable capacitors disposed upon said substrate.

13. A digital to analog converter, comprising:
   M phase-shifters, each phase shifter configured for receiving a digital representation of a desired waveform and generating a respective phase-shifted digital representation of the desired waveform, wherein the phase-shifted digital representations are phase-separated by 360°/M, where M is an integer greater than one;
   M groups of time-interleaved (TI) radio frequency (RF) digital-to-analog converters (DACs), each TI-RF-DAC group being configured to process a respective one of the phase-shifted digital representations of the desired waveform to provide thereby a respective phase-shifted analog signal component, each phase-shifted analog signal component forming a portion of a desired phase-shifted analog signal;
   N mixers, where N is an integer equal to or greater than M, each mixer is configured to process one of the respective phase-shifted analog signals to reverse a phase-shift associated with that analog signal and provide thereby a respective in-phase analog signal;
   a combiner, to combine the M in-phase analog signals to provide a combined analog signal; and
   a bandpass filter, for passing spectra associated with a sideband of the combined analog signal to provide thereby a band-limited analog signal suitable for transmission.

14. A digital to analog signal conversion method, comprising:
   at each of M phase-shifters, in response to receiving a digital representation of a desired waveform, generating a respective phase-shifted digital representation of the desired waveform, wherein the phase-shifted digital representations are phase-separated by 360°/M, where M is an integer greater than one;
   at each of M groups of time-interleaved (TI) radiofrequency (RF) digital-to-analog converters (DACs), processing a respective one of the phase-shifted digital representations of the desired waveform to provide thereby a respective phase-shifted analog signal component, each phase-shifted analog signal component forming a portion of a desired phase-shifted analog signal;
   at each of N mixers, where N is an integer equal to or greater than M, processing one of the respective phase-shifted analog signals to reverse a phase-shift associated with that analog signal and provide thereby a respective in-phase analog signal;
   at a combiner, combining the M in-phase analog signal to provide a combined analog signal; and
   at a bandpass filter, processing the combined analog signal to pass spectra associated with a sideband of the combined analog signal to provide thereby a band-limited analog signal suitable for transmission.

15. The method of claim 14, further comprising transmitting the band-limited analog signal via an antenna.

16. The method of claim 14, wherein said mixing comprises mixing a respective phase-shifted analog signal with a phase offset local oscillator (LO) signal.

17. The method of claim 14, wherein each TI-RF-DAC group comprises L TI-RF-DACs.

18. The method of claim 17, wherein M=4 and L=4 and the desired waveform is represented by in-phase/quadrature phase (I/Q) components, and wherein the digital representation of a desired waveform provided to the M phase shifters comprises a respective one of digital waveform components I, Q, −I and −Q.

19. The method of claim 17, further comprising:
at an in-phase/quadrature phase (I/Q) modulator, modulating a baseband digital input signal to provide the digital waveform components I, Q, −I and −Q.

20. The method of claim 19, wherein the baseband digital input signal comprises one of a communications signal, a radio signal, and a network transmission signal.

* * * * *